(12) United States Patent
Buechs

(10) Patent No.: US 9,902,312 B1
(45) Date of Patent: Feb. 27, 2018

(54) WHISKER ILLUMINATION APPARATUS

(71) Applicant: Scott Buechs, W. Yarmouth, MA (US)

(72) Inventor: Scott Buechs, W. Yarmouth, MA (US)

( * ) Notice: Subject to any disclaimer, the term of this patent is extended or adjusted under 35 U.S.C. 154(b) by 246 days.

(21) Appl. No.: 14/817,651

(22) Filed: Aug. 4, 2015

Related U.S. Application Data

(60) Provisional application No. 62/070,450, filed on Aug. 25, 2014.

(51) Int. Cl.
*B60R 21/34* (2011.01)
*B60Q 1/26* (2006.01)
*B60Q 1/00* (2006.01)
*B60Q 1/28* (2006.01)
*E01H 5/06* (2006.01)

(52) U.S. Cl.
CPC ......... *B60Q 1/2661* (2013.01); *B60Q 1/0035* (2013.01); *B60Q 1/2607* (2013.01); *B60Q 1/2657* (2013.01); *B60Q 1/2696* (2013.01); *B60Q 1/28* (2013.01); *E01H 5/061* (2013.01)

(58) Field of Classification Search
CPC ...... B60Q 1/2661; B60Q 1/28; B60Q 1/2696; E01H 5/061
See application file for complete search history.

(56) References Cited

U.S. PATENT DOCUMENTS

| | | | | |
|---|---|---|---|---|
| 3,683,842 A * | 8/1972 | Logan | .................. | B60Q 1/2657 116/28 R |
| 4,054,302 A * | 10/1977 | Campbell | ................ | B60D 1/36 116/28 R |
| 5,778,567 A * | 7/1998 | Jager | ......................... | E01H 5/06 172/272 |
| 6,341,794 B1 * | 1/2002 | Hunter | ..................... | B60D 1/36 116/28 R |
| 6,362,727 B1 * | 3/2002 | Guy, Jr. | .................. | E01H 5/066 340/425.5 |
| 6,371,633 B1 * | 4/2002 | Davis | ................... | B60Q 1/2657 362/370 |
| 6,393,737 B2 * | 5/2002 | Quenzi | ..................... | E01H 5/06 37/231 |
| 6,409,367 B1 * | 6/2002 | Pratt | .................... | B60Q 1/2657 340/471 |
| 6,484,421 B1 * | 11/2002 | Donoghue | ................ | E01H 5/06 37/231 |
| 6,540,247 B1 * | 4/2003 | Perkins | .................... | B60D 1/36 116/28 R |
| 2004/0095743 A1 * | 5/2004 | Yu | ........................ | G02B 6/0061 362/613 |

(Continued)

*Primary Examiner* — Elmito Breval
(74) *Attorney, Agent, or Firm* — Salter & Michaelson

(57) ABSTRACT

A whisker illumination apparatus is for attachment to a plow blade with one such apparatus being secured to opposite sides of the plow blade for marking the outer extremities of the plow blade. Each such apparatus includes an elongated and translucent or transparent tubular member having top and bottom ends, and a mounting piece secured to the bottom end of the elongated and translucent or transparent tubular member, and for mounting from a mounting surface of the snow plow blade so that the elongated tubular member is disposed in a substantially vertical position. The apparatus also includes an elongated light string that extends within the elongated tubular member between the top and bottom ends thereof, a source of electrical energy for the elongated light string, and conductor wiring for connecting the source of electrical energy to the elongated light string.

20 Claims, 8 Drawing Sheets

(56) References Cited

U.S. PATENT DOCUMENTS

| | | | | |
|---|---|---|---|---|
| 2005/0013127 A1* | 1/2005 | Tsai | G02B 6/002 | 362/613 |
| 2007/0008739 A1* | 1/2007 | Kim | G02B 6/0021 | 362/612 |
| 2007/0284597 A1* | 12/2007 | Nawashiro | G02B 6/0021 | 257/89 |
| 2008/0043170 A1* | 2/2008 | Ikeda | G02B 6/0016 | 349/65 |
| 2008/0259641 A1* | 10/2008 | Suzuki | G02B 5/045 | 362/612 |
| 2009/0015753 A1* | 1/2009 | Ye | G02B 6/002 | 349/64 |
| 2009/0135623 A1* | 5/2009 | Kunimochi | G02B 6/0016 | 362/608 |
| 2010/0002465 A1* | 1/2010 | Tsang | G02B 6/0021 | 362/612 |
| 2010/0014315 A1* | 1/2010 | Fujimoto | G02B 6/001 | 362/615 |
| 2010/0208496 A1* | 8/2010 | Kim | B29D 11/00663 | 362/613 |
| 2011/0019437 A1* | 1/2011 | Liao | G02B 6/0061 | 362/615 |
| 2011/0297406 A1* | 12/2011 | Lhota | A01B 59/00 | 172/274 |
| 2012/0026751 A1* | 2/2012 | Lin | G02B 6/0021 | 362/611 |
| 2012/0188792 A1* | 7/2012 | Matsumoto | G02B 6/0036 | 362/613 |
| 2013/0208502 A1* | 8/2013 | Nakayama | G02B 6/0018 | 362/608 |
| 2013/0212912 A1* | 8/2013 | Guggino | E02F 3/962 | 37/197 |
| 2013/0335972 A1* | 12/2013 | Hubner | B60Q 1/2657 | 362/253 |
| 2014/0198279 A1* | 7/2014 | Yang | G02B 6/0011 | 349/62 |
| 2015/0225914 A1* | 8/2015 | Tykalsky | E01H 5/066 | 37/266 |

\* cited by examiner

WHISKER ILLUMINATION APPARATUS

RELATED CASES

Priority for this application is hereby claimed under 35 U.S.C. § 119(e) to commonly owned and U.S. Provisional Patent Application No. 62/070,450 which was filed on Aug. 25, 2014 which is incorporated by reference herein in its entirety.

FIELD OF THE INVENTION

The present invention relates in general to an apparatus or device for marking the location of an object preferably by means of an illumination apparatus that makes the apparatus or device more readily observable to anyone in the vicinity of the apparatus or device. More particularly, the present invention relates to a whisker illumination apparatus for attachment to a plow blade with one such apparatus being secured to opposite sides of the plow blade for marking the outer extremities of the plow blade and visually observable away from the plow blade. The present invention also relates to an illumination apparatus that can be used for marking certain extremities of other equipment such as a heavy equipment vehicle or wide-load trailer.

BACKGROUND OF THE INVENTION

Plows are most often used as a quick and efficient way to clear away snow, mud or debris, particularly for widespread use in plowing snow. When operating in darkness, the plow driver has to be constantly aware of the projected path of the plow blade relative to a curb placement, parked cars and other objects in the general path of the blade. Currently, most plow blades have what is commonly called a "whisker" which is typically a thin post mounted on top of the plow blade at each end and painted a bright yellow. These existing whisker form markers that allow the driver to get some idea of the extent to which the plow blade will clear an object. Without illumination, the whiskers are difficult to see in the dark and are often obscured by the throw-off of the material being plowed, such as ice or snow. Thus, the viewing of the whiskers is often blocked or compromised. For the same reasons, without illumination, pedestrians and oncoming and approaching vehicles are not aware of the total blade swath until they are in close proximity. Taking evasive action with a last second notice can create a very dangerous situation.

Accordingly, it is an object of the present invention to provide an apparatus or device for marking the location of an object preferably by means of an illumination apparatus that makes the apparatus or device more readily observable to anyone in the vicinity of the apparatus or device.

Another object of the present invention is to provide a whisker illumination apparatus for, in particular, attachment to a snow plow blade with one such apparatus being secured to opposite sides of the snow plow blade for marking the outer extremities of the snow plow blade and visually observable away from the snow plow blade.

Still another object of the present invention is to provide a kit for assembling two or more whisker illumination posts that are to be mounted to opposite sides of a snow plow blade for marking the outer extremities of the plow blade and visually observable away from the plow blade, the snow plow blade being mountable to a vehicle.

SUMMARY OF THE INVENTION

To accomplish the foregoing and other objects, features and advantages of the present invention there is provided an apparatus for marking the location of an object and that comprises an elongated and translucent or transparent tubular member having top and bottom ends, a mounting piece secured to the bottom end of the elongated and translucent or transparent tubular member, said mounting piece constructed and arranged for mounting from a mounting surface of the object so that the elongated and translucent or transparent tubular member is disposed in a substantially vertical position, an elongated light string that extends within the elongated and translucent or transparent tubular member between the top and bottom ends of the elongated and translucent or transparent tubular member, a source of electrical energy for the elongated light string, and conductor wiring for connecting the source of electrical energy to the elongated light string.

In accordance with other aspects of the present invention the elongated light string is comprised of an elongated support strip and a plurality of LED's that are spaced along the elongated support strip; including separate connecting wires that couple between adjacent LED's; the mounting piece includes a mounting coupling having a top flange for engagement with the bottom end of the elongated and translucent or transparent tubular member and a base that extends through a hole in a plate member of the object; the plate member forms part of a snow plow blade and including a nut for threading onto the base; the elongated light string is comprised of an array of spaced apart LED's including at least one LED that extends above the top end of the elongated and translucent or transparent tubular member so that the one LED is observable over the top end of the elongated and translucent or transparent tubular member; including more than one LED that extends above the top end of the elongated and translucent or transparent tubular member; the elongated light string extends linearly within the elongated and translucent or transparent tubular member, and is disposed in a reverse arc where it extends above the elongated and translucent or transparent tubular member; the object is a snow plow blade attached to a plow vehicle that also has auxiliary lighting, the snow plow blade having a horizontally disposed plate member with a hole therein for receiving a portion of the mounting piece and a locking nut for securing the mounting piece to the plate member, the auxiliary lighting forming the source of electrical energy for the elongated light string; and the conductor wiring includes wiring that extends from the elongated light string, across a back side of the plow blade, along a plow blade support apparatus and to the auxiliary lighting.

In another version of the present invention there is provided a whisker illumination apparatus for attachment to a plow blade with one such apparatus being secured to opposite sides of the plow blade for marking the outer extremities of the plow blade and visually observable away from the plow blade. Each such apparatus comprises an elongated and translucent or transparent tubular member having top and bottom ends, a mounting piece secured to the bottom end of the elongated and translucent or transparent tubular member. The mounting piece is constructed and arranged for mounting from a mounting surface of the snow plow blade so that the elongated and translucent or transparent tubular member is disposed in a substantially vertical position. The apparatus also includes an elongated light string that extends within the elongated and translucent or transparent tubular member between the top and bottom ends of the elongated and translucent or transparent tubular member, a source of electrical energy for the elongated light string, and conductor wiring for connecting the source of electrical energy to the elongated light string for illumination of the elongated light string.

In accordance with still other aspects of the present invention the elongated light string is comprised of an elongated support strip and a plurality of LED's that are spaced along the elongated support strip, including separate connecting wires that couple between adjacent LED's; the mounting piece includes a mounting coupling having a top flange for engagement with the bottom end of the elongated and translucent or transparent tubular member and a base that extends through a hole in a plate member of the snow plow blade, and including a nut for threading onto the base; the elongated light string is comprised of an array of spaced apart LED's including at least one LED that extends above the top end of the elongated and translucent or transparent tubular member so that the one LED is observable over the top end of the elongated and translucent or transparent tubular member; more than one LED extends above the top end of the elongated and translucent or transparent tubular member; the elongated light string extends linearly within the elongated and translucent or transparent tubular member, and is disposed in a reverse arc where it extends above the elongated and translucent or transparent tubular member; the snow plow blade is attached to a plow vehicle that also has auxiliary lighting, the snow plow blade having a horizontally disposed plate member with a hole therein for receiving a portion of the mounting piece and a locking nut for securing the mounting piece to the plate member, the auxiliary lighting forming the source of electrical energy for the elongated light string; the conductor wiring includes wiring that extends from the elongated light string, across a back side of the plow blade, along a plow blade support apparatus and to the auxiliary lighting.

In another version of the present invention there is provided a kit for providing two or more whisker illumination posts that are to be mounted to opposite sides of a snow plow blade for marking the outer extremities of the plow blade and visually observable away from the plow blade, the snow plow blade being mountable to a vehicle. The kit comprises a pair of elongated and translucent or transparent tubular members each having top and bottom ends, a mounting coupling for securing to the bottom end of the elongated and translucent or transparent tubular member, said mounting coupling constructed and arranged for mounting from a mounting surface of the snow plow blade so that the elongated and translucent or transparent tubular member is disposed in a substantially vertical position, an elongated light string that is for disposition into the elongated and translucent or transparent tubular member, conductor wiring for connecting a source of electrical energy to the elongated light string for illumination of the elongated light string, a plurality of wire ties useable in securing the conductor wiring to a back side of the snow plow blade, and wire conduit useable over the conductor wiring. The kit may be further comprised of a plurality of cap screws useable in securing the conductor wiring from an electrical source, and a plurality of nuts for securing the mounting coupling with the mounting surface of the snow plow blade.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

The present invention provides for illumination of the side edges of a plow blade mounted in the front of a truck or tractor. For safety reasons, illumination of the side extremities of a plow blade reduces the possibility of personal injury to a person and property damage both in front of and in back of the plow truck. Typically, the plow blade is wider than the vehicle pushing it. Illumination of the extremities of the plow blade increases the driver's visibility of the plow blade swath as well as the visibility of vehicles, pedestrians or obstacles moving in the same or the opposite direction. The concepts of the present invention can also be applied for other uses such as to highlight fixed objects such as a fire hydrant, a parked vehicle or other items in the path of the plow. For faster vehicles approaching from the same direction, oncoming vehicles and pedestrians, the illumination apparatus serves as a safety measure. The apparatus or device for the present invention provides additional time for both the plow driver and others to take evasive action depending on the circumstances.

In the illustrated embodiments herein the whisker illumination system that is described provides for the illumination of an object mounted on the front of a vehicle such as a plow truck wherein the plow is a snow plow and is typically wider than the vehicle from which the snow plow is mounted. The illumination system or marker can also be used to demarcate the width of a mechanism on a truck bed which is wider than the truck cab such as with a cement truck or sander, or in connection with pulling a trailer that is wider than the truck cab. However, for the purpose of explaining the illumination system, apparatus and device of the present invention the description is directed at a snow plow blade mounter at the front of a plow truck as illustrated in FIG. 1 herein.

Figure 1:
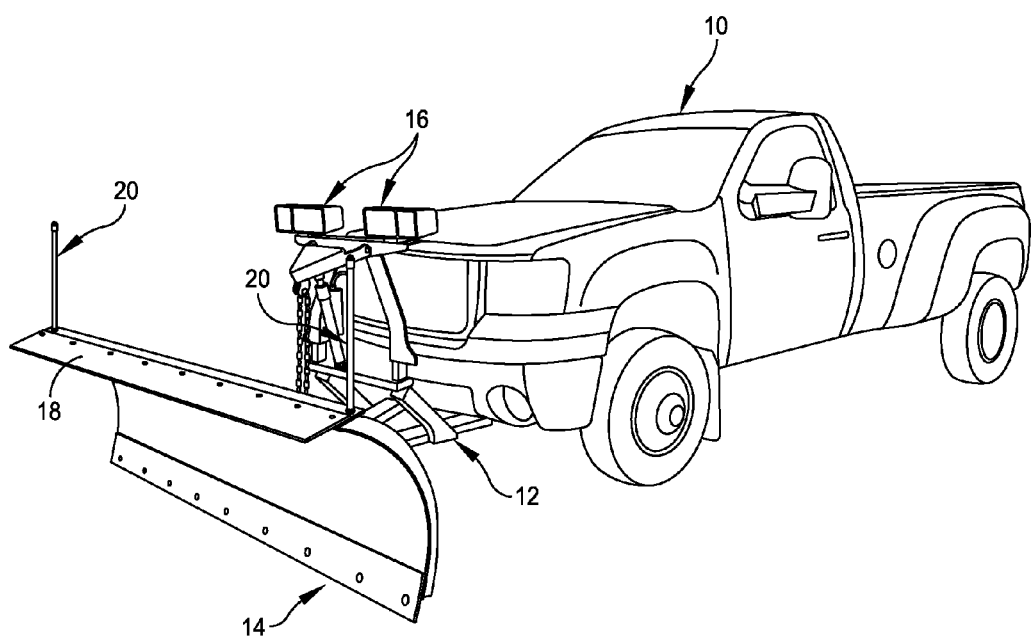
FIG. 1 is a perspective view showing the illumination posts of the present invention as positioned on a plow blade.
Figure 2:
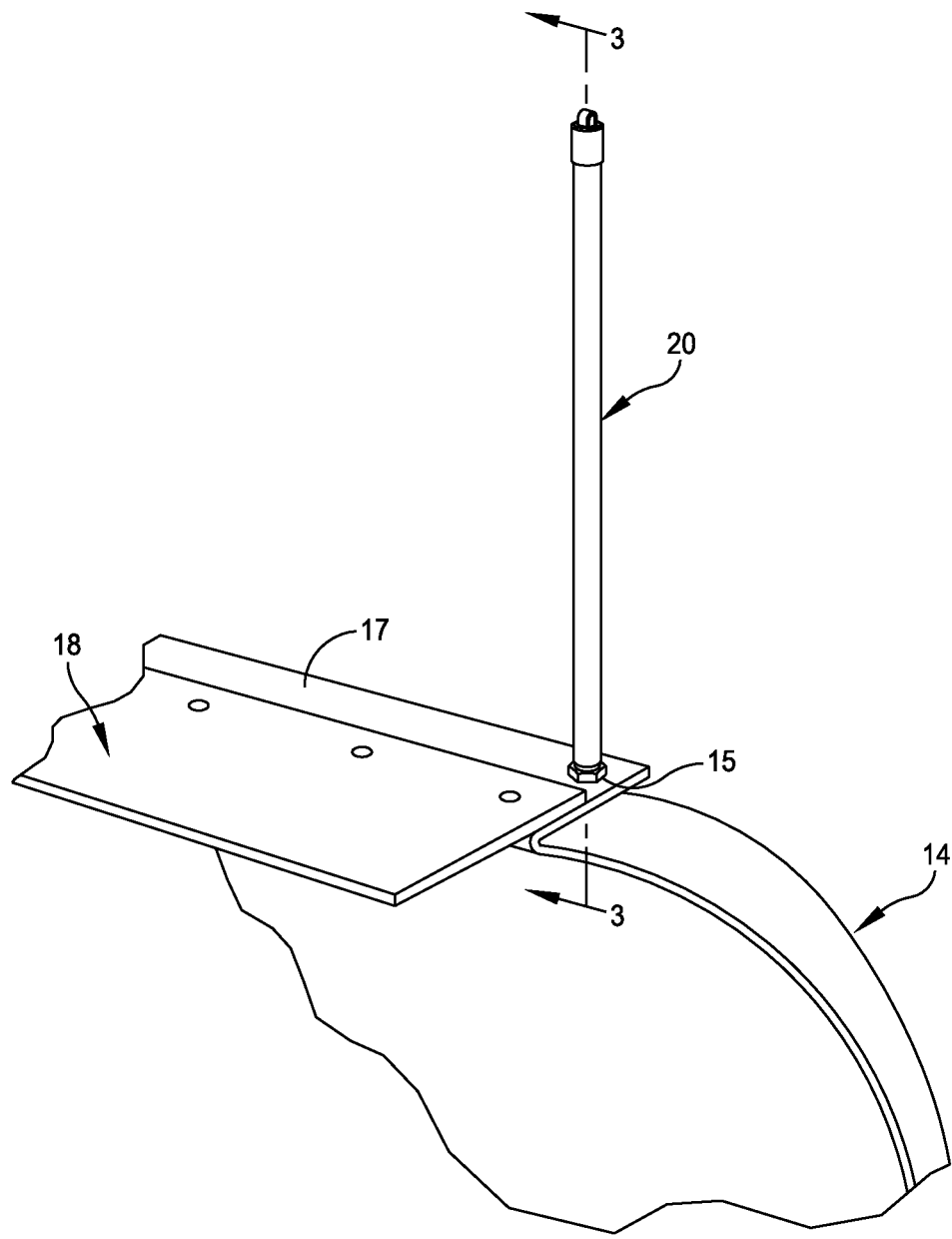
FIG. 2 is a fragmentary perspective view showing somewhat further detail of the illumination post.
Figure 3:
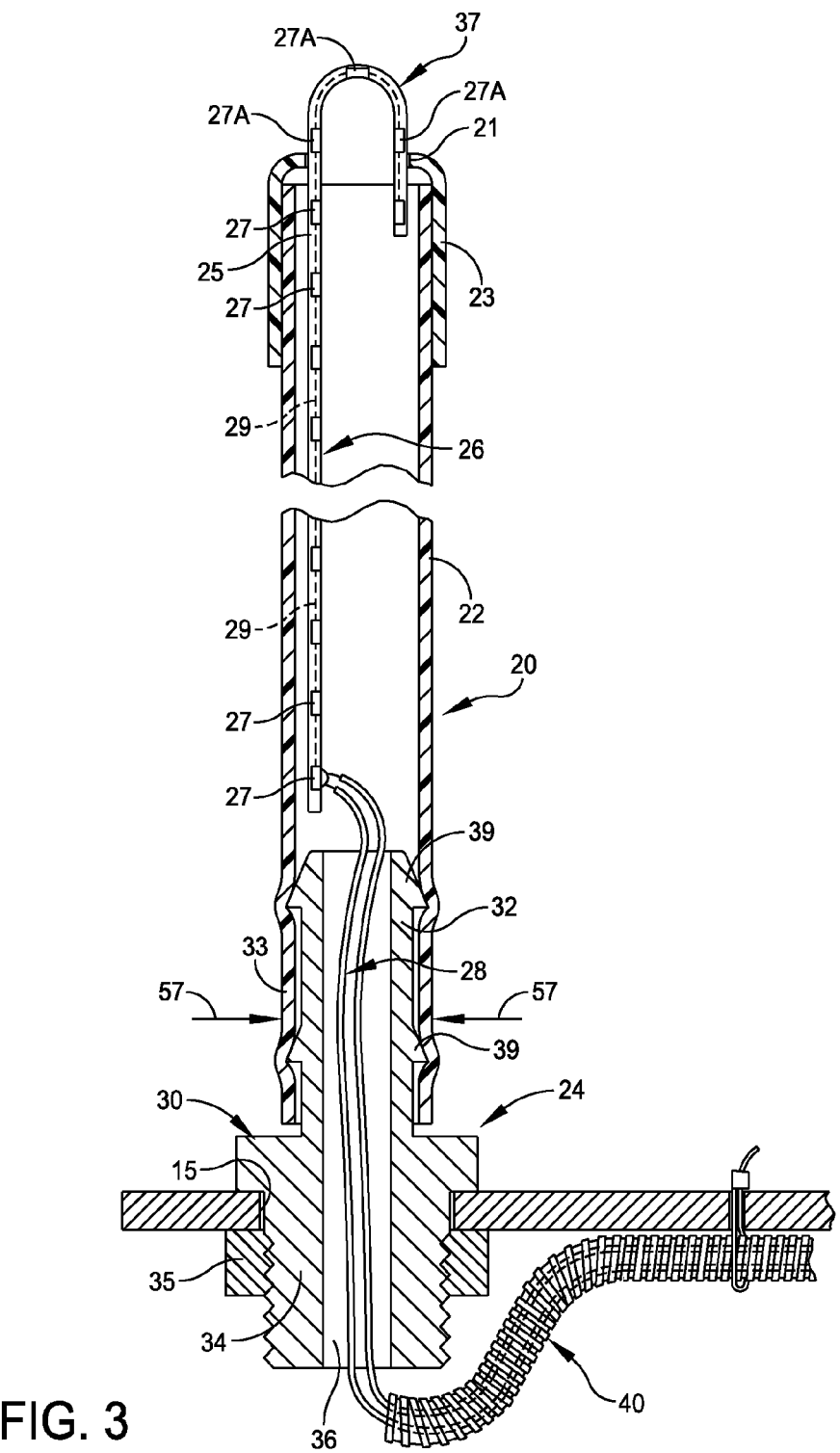
FIG. 3 is a cross-sectional view taken along 3-3 of FIG. 2 and showing further details of the illumination post or whisker.
Figure 4:
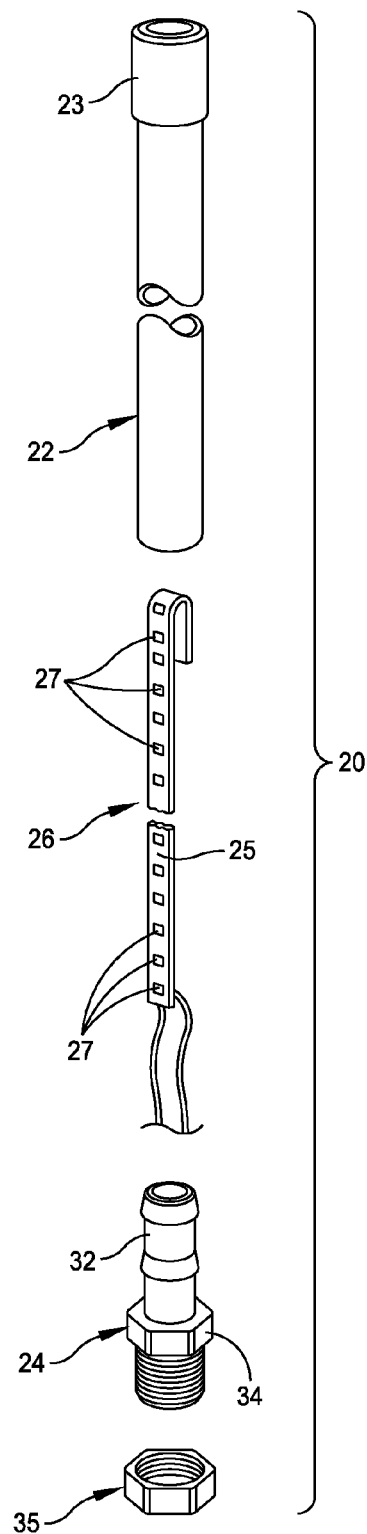
FIG. 4 is an exploded perspective view illustrating the components of the illumination apparatus.
Figures 5, 6:
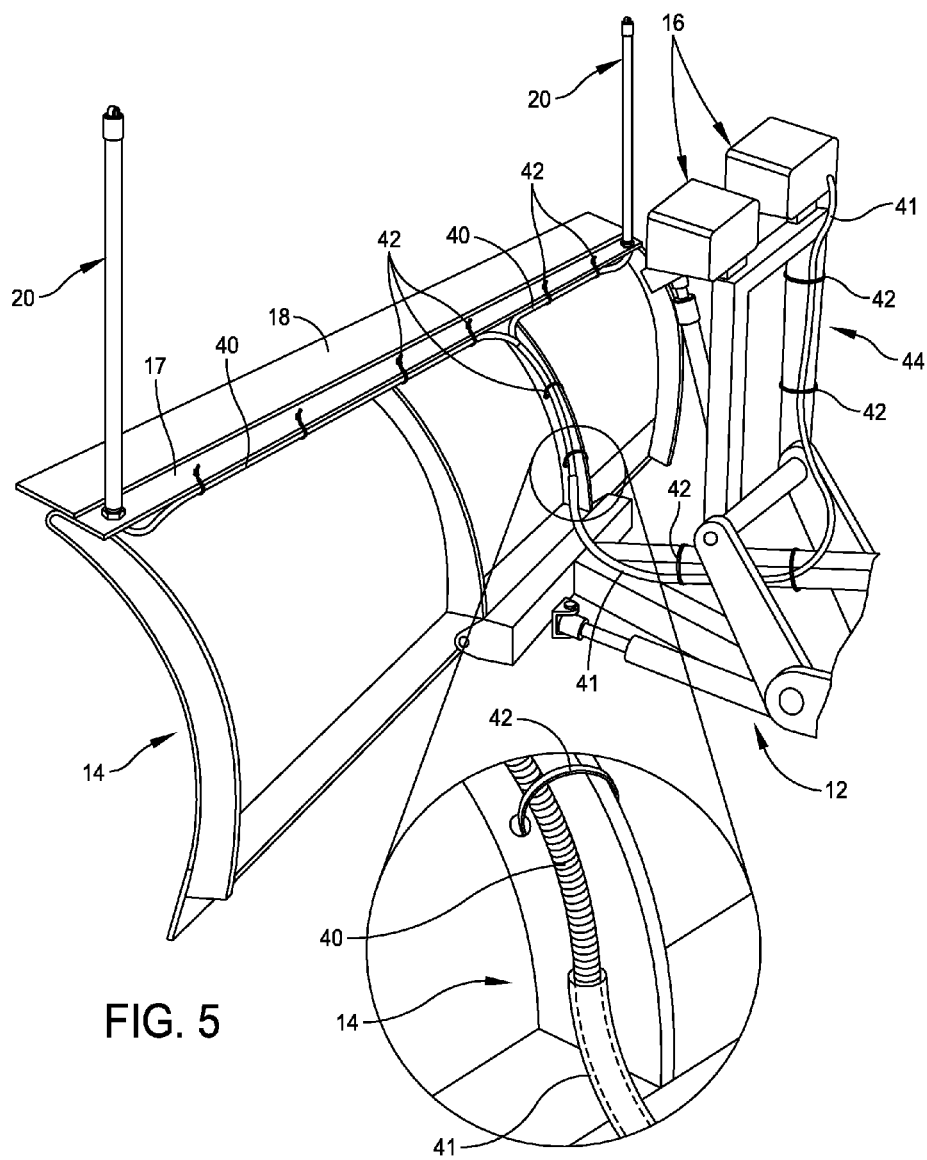
FIG. 5 is a rear perspective view showing the illumination apparatus and wiring.
FIG. 6 is a fragmentary view illustrating the wiring support sleeves.
Figure 7:
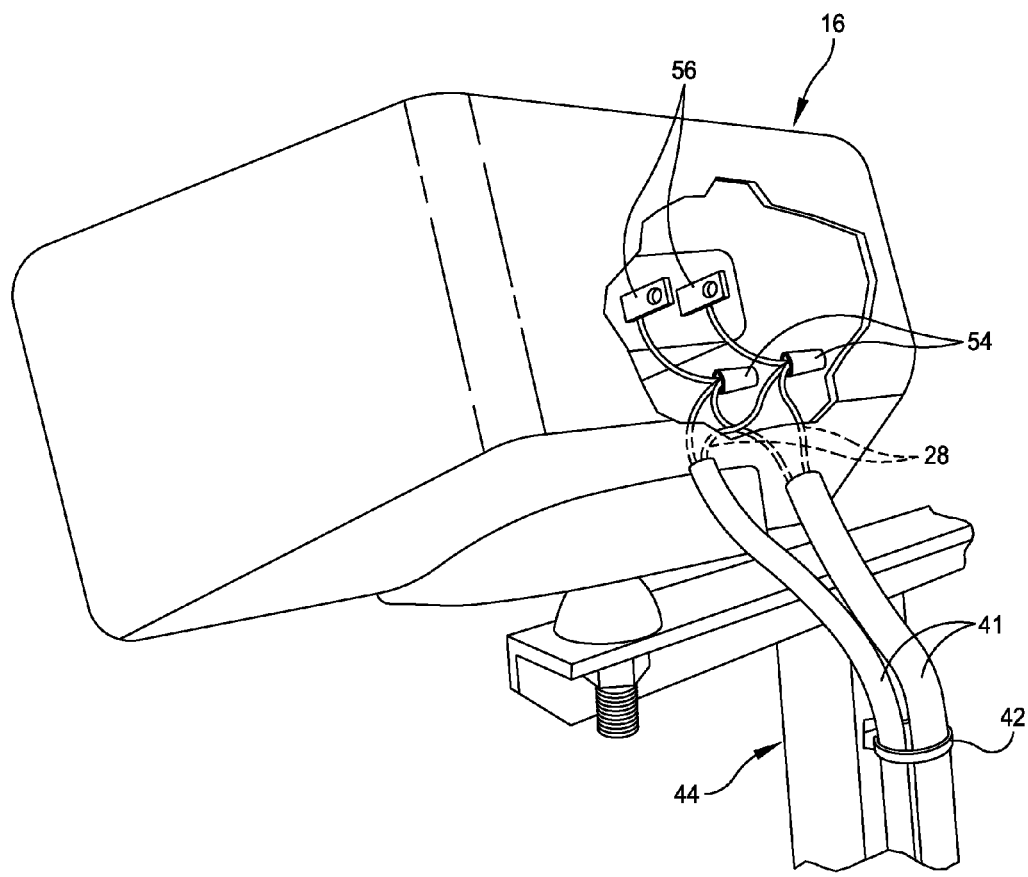
FIG. 7 is a rear perspective view at the auxiliary lighting device.
Figure 8:
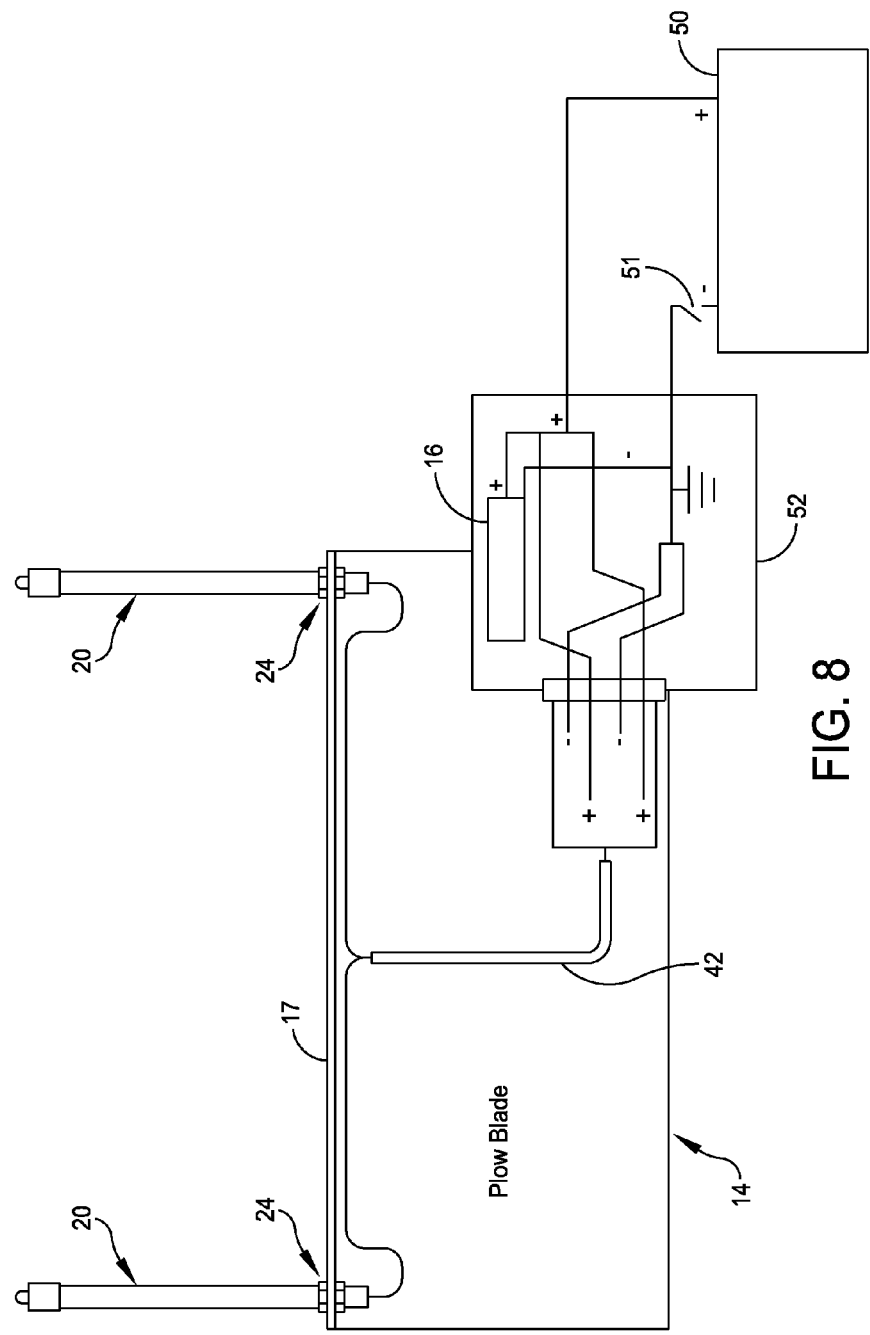
FIG. 8 is an electrical schematic diagram of the wiring to the illumination apparatus.
Figure 9:
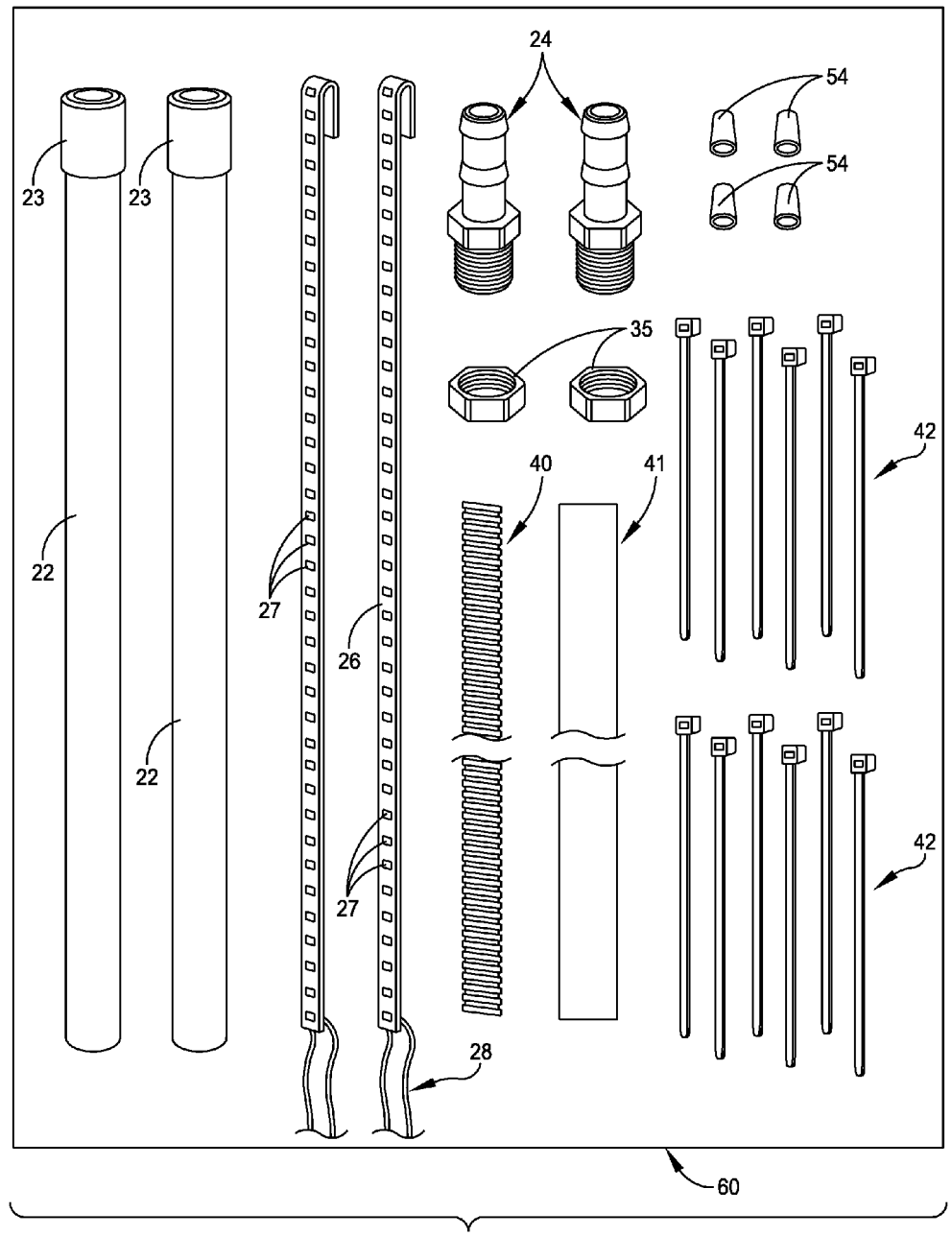
FIG. 9 shows the components of a kit that contains preferably two whisker illumination posts and the various components used for installation of these illumination posts.

Regarding the drawings, FIG. 1 is a perspective view showing the illumination posts of the present invention as positioned on a plow blade. FIG. 2 is a fragmentary perspective view showing somewhat further detail of the illumination post. FIG. 3 is a cross-sectional view taken along 3-3 of FIG. 2 and showing further details of the illumination post or whisker. FIG. 4 is an exploded perspective view illustrating the components of the illumination apparatus. FIG. 5 is a rear perspective view showing the illumination apparatus and wiring. FIG. 6 is a fragmentary view illustrating the wiring support sleeves. FIG. 7 is a rear perspective view at the auxiliary lighting device. FIG. 8 is an electrical schematic diagram of the wiring to the illumination apparatus. FIG. 9 shows the components of a kit that contains preferably two whisker illumination posts and the various components used for installation of these illumination posts.

Reference is now made to the drawings for an illustration of an apparatus for marking the location of an object. In the drawings the illustrations are for marking the extremities of a snow plow blade, although the apparatus could also be used for several other object marking applications including marking other vehicle locations or marking fixed objects such as a fire hydrant. FIGS. 1, 2 and 5 show further details of what could be considered as a conventional vehicle 10 having a conventional plow blade support structure shown at 12 and plow blade 14. Because the vehicle, plow blade and support are primarily of conventional design they are not described in detail herein. These structures are well-known to those skilled in the art. Typically, the plow blade 14 has both up and down control as well as side to side control so that plow blade 14 can be adjusted from the cab of the vehicle. For larger swaths, an angled wing plow blade (not shown) can be mounted on the sides of the plow truck, and can be equipped with the marking apparatus of the present invention. Winged plow blades are particularly useful in clearing runways and large open areas. Also illustrated in FIGS. 1 and 5 are a pair of conventional plow illumination lights 16 controlled from the cab of the vehicle. Hereinafter, is a discussion of the manner in which power to the illumination devices of the present invention are derived from the plow illumination lights 16, so that their operation is concurrent.

In accordance with the embodiment described herein there is a whisker illumination apparatus 20 for attachment to a plow blade 14 with one such apparatus (illuminated whisker) being secured to opposite sides of the plow blade 14 for marking the outer extremities of the plow blade and visually observable away from the plow blade. Refer to FIGS. 1 and 5 for an illustration of the positioning of the whiskers 20. Each such apparatus 14 is comprised of an elongated and translucent or transparent tubular member 22 having top and bottom ends and a mounting piece 24 secured to the bottom end of the elongated and translucent or transparent tubular member. The mounting piece 24 is constructed and arranged for mounting from a mounting surface of the snow plow blade so that the elongated and translucent or transparent tubular member 22 is disposed in a substantially vertical position as illustrated in FIG. 1. This mounting surface is shown at the horizontally disposed flange 17 of the plow construction that is provided with a circular hole 15 for receiving the mounting piece 24, as shown in FIG. 3. The flange 17 is maintained substantially horizontal in use in order to maintain the illuminated whiskers substantially vertical which is the desired position for maximum illuminated exposure.

The top end of the elongated tubular member is provided with a tubular cap 23 that is engaged over the top end of the elongated tubular member 22. The elongated tubular member 22 has a top aperture 21 that is of a slightly smaller diameter than the inner diameter of the elongated tubular member 22, as disclosed in FIG. 3. This cap 23 is constructed and arranged so that a portion of the light string 26 extends over the top surface of the cap 23. The elongated tubular member 22 is either transparent or at least translucent and may be constructed of a plastic material such as lexan. The elongated tubular member 22 may be of a material that allows a substantial portion of the light from the light string 26 to pass through the sidewall of the elongated tubular member 22, but less than being completely transparent. The portion of the light string 26 that extends above the cap 23, per FIG. 3, provides a brighter light source above the elongated tubular member 22 in the form of one or more LED's that directly emanate light that is readily observable by the driver of the vehicle or anyone remote but close to the vehicle (for example, a pedestrian).

The apparatus of FIG. 3 also includes an elongated light string 26 that extends within the elongated and translucent or transparent tubular member 22 between the top and bottom ends of the elongated and translucent or transparent tubular member 22, a source of electrical energy for the elongated light string 26, and conductor wiring 28 for connecting the source of electrical energy to the elongated light string 26 for illumination of the elongated light string 26. The elongated light string 26 is comprised of an elongated support strip 25 and a plurality of LED's 27 that are spaced along the elongated support strip. The elongated support strip 25 may be constructed of an insulating material and preferably is somewhat resilient. Separate connecting wires 29 couple between adjacent LED's so that a series circuit is formed with all of the LED's 27. FIG. 3 also shows the conductor wiring 28 that electrically connects to the base of the elongated light string 26. The conductor wiring is in a pair in order to provide positive and negative conductors to provide the proper polarity to each and every LED 27.

In FIG. 3 the mounting piece 24 includes a mounting coupling 30 having a top collar 32 for engagement with the bottom end 33 of the elongated and translucent or transparent tubular member 22, and a base 34 that extends through a hole 15 in a plate member of the object, namely through the flange 17. Also illustrated in FIG. 3 is a nut 35 for threading onto a lower threaded portion of the base 34. The base 34 also includes an upper portion that engages over the hole 15 in the flange 17. The base 34 is generally of a larger diameter than the diameter of the top collar 32. The mounting coupling 30 is preferably constructed of a hard plastic material. The nut 35 is also preferably constructed of a hard plastic material. The nut 35 is tightened to secure the mounting coupling 30 in place. The mounting coupling 30 has a center through passage 36 for accommodating the conductor wiring 28. FIG. 3 also illustrates a flexible sleeve at 40 for receiving the conductor wiring 28 and a wire tie at 42 for securing the sleeve 40 in place relative to the plow blade. See also FIG. 5 where wire ties are shown at 42 extending, at spaced locations, along the plow flange 17, as well as at other locations at the support structure 12 for supporting the plow blade from the vehicle.

The attachment between the mounting coupling 30 and the bottom end of the elongated tubular member 22 may be considered as in the form of a crimp that is applied in the direction of arrows 57 in FIG. 3. For this purpose, the top collar 32 may be provided with at least a pair of annular and outer extending wings 39. The top collar 32, as well as the remaining portion of the mounting collar 30, is constructed of a hard plastic material. Particularly the bottom end 33 of the elongated tubular member 22 is sufficiently pliable so that it can be crimped in the direction of arrows 57 so as to firmly hold the tubular member 22 with the top collar 32 of the mounting coupling 30. Other securing arrangements may also be provided between the elongated tubular member 22 and the mounting coupling 30. The mounting coupling 30 forms the main means by which the illumination post is supported in a fixed position from the object, or in connection with the illustrations and the drawings, from the snow plow blade.

As indicated previously, the elongated light string 26 is comprised of an array of spaced apart LED's including at least one LED 27A (in fact three are shown above the cap 23 in FIG. 3) that extends above the top end of the elongated and translucent or transparent tubular member 22 so that the one LED is observable over the top end of the elongated and translucent or transparent tubular member 22. As illustrated in the drawings more than one LED is used in a serial array that includes preferably multiple LED's 27A that extend above the top end of the elongated and translucent or transparent tubular member 22. The elongated light string 26 extends linearly within the elongated and translucent or transparent tubular member 22, and is disposed in a reverse arc or loop at 37 where it extends in a loop above the elongated and translucent or transparent tubular member 22. This loop 37 includes at least one LED 27A, and preferably more than one LED 27A so as to provide sufficient illumination above the tubular member 22 and, in particular, above the cap 23 (see FIG. 3).

The power to the illumination devices is provided basically by the conductor wiring 28. As indicated in FIG. 3 the wiring is preferably covered by a sleeve shown at 40. The fragmentary view of FIG. 6 shows the sleeve 40 that can extend into an outer sleeve 41. Refer also to FIG. 5 where the wiring is shown extending through the outer sleeve 41 particularly at the plow support mechanism 12. Wire ties 42 are also illustrated in FIG. 5 for securing the sleeve 41 to various structural members of the support mechanism or structure 12. Also illustrated in FIG. 5 is an auxiliary light support frame shown at 44 that supports a pair of auxiliary lights 16. The frame 44 and auxiliary lights 12 may be of conventional type. The auxiliary lighting forms the source of electrical energy for the elongated light string 26 and the conductor wiring includes wiring that extends from the elongated light string 26 across a back side of the plow blade, along the plow blade support mechanism 44 and to the auxiliary lighting at 16.

FIG. 7 is a partial rear perspective view showing the manner in which the conductor wiring 28 extends from the respective sleeve 41 for securing to the conductor clips 56 associated with the auxiliary lighting 16. The auxiliary lighting 16 is normally activated from a switch within the cab of the vehicle. When this auxiliary lighting is illuminated then the power is applied at the conductor clips 56 and this power is fed off from those clips to the conductor wires 28. FIG. 7 illustrates electrical securing caps 54 that are usable for capping off the electrical power from the auxiliary light 16 so that it can be used to power the illumination posts 20. FIG. 7 also illustrates one of the wire tires at 42. Refer also to the rear perspective view of FIG. 5 showing the wire ties at 42 and the sleeve at 41.

Reference is now also made to the electrical diagram shown in FIG. 8. This schematically illustrates the plow blade and the illumination posts 20. Also illustrated in FIG. 8 is the auxiliary lighting at 16 in the form of a plow light box 52 that may basically be considered as of conventional design. FIG. 8 also illustrates the vehicle battery at 50 and a switch at 51 that is illustrative of a switch in the cab of the vehicle that can excite the plow lighting box 52. The electrical diagram shows the opposite polarity connections. As soon as the plow lights are turned on, then, concurrent with that action, the illumination posts 20 are also illuminated. In an alternate embodiment of the present invention, a separate switch may be used for independently operating the illumination posts 20.

Reference is now made to FIG. 9 which illustrates the kit 60 of the present invention. This includes a pair of elongated tubular members 22 and a pair of elongated light strings 26 each supporting a plurality of spaced apart LEDs 27. The kit 60 also includes a pair of mounting pieces 24, nuts 35, and different types of sleeves 40 and 41. In order to complete the kit, there is also provided a plurality of wire ties 42, a plurality of conductor caps 54. Usually there are four caps 54 two associated with each of the members 22.

The kit 60 is usable to readily install the illumination posts of the present invention. Also possibly included in the kit are lengths of conductor wiring 28. The light strings 26 are installed respectively in the elongated tubular members 22. Each of the light strings 26 is preferably positioned as illustrated in FIG. 3 and may be secured in place in an elongated tubular member such as with the use of a fixing adhesive. The light string 26 is meant to be positioned as illustrated in FIG. 3 with the top end at 37 looped over and extending over the cap 23. Once the light string is in place, then each of the respective mounting pieces 24 is secured with a respective elongated tubular member. The conductor wiring 28, as also illustrated in FIG. 3, passes through the mounting piece 24 through an elongated passage 36 therein.

FIGS. 1 and 3 also illustrate the hole 15 within the flange 17. This hole 15 is usually already provided in the flange and is used as the mounting point for each of the illumination posts. FIG. 3 illustrates the hole at 15. After the illumination post has been assembled, then the mounting piece 24 is inserted in the hole 15 and the illumination post is secured in place by means of the securing nut 35.

Within the kit, there are also provided conductor caps 54 and wire ties 42. The sleeves 40 and 41 are used for coupling the conductor wires 28 at the various locations such as illustrated in the rear perspective view of FIG. 5. The wiring ties 42 are used for securing the sleeves 41 and associated conductor wires 28 in place. In FIG. 5 the wiring from each of the illumination posts extends along the backside of the flange 17, downwardly of a structure of the snow plow blade itself and further wire ties 42 are used for securing the sleeve 41 in place.

Having now described a limited number of embodiments of the present invention, it should now be apparent to those skilled in the art that numerous other embodiments and modifications thereof are contemplated as falling within the scope of the present invention, as defined by the appended claims. Although the principles of the present invention have been described in association with marking in particular the extremities of a plow blade, the concepts of the present invention may also be applied to marking the extremity of other pieces of apparatus such as a wide-load trailer, a heavy equipment vehicle or any other type of service vehicle. Some existing vehicles may be provided with markers but they are not provided with illumination markers. For application to heavy equipment vehicles and trailers, there may be a requirement for a modification to the mounting bracket and wiring. However, the principles of attachment are basically the same as described in association with a snow plow blade.

What is claimed is:

1. An apparatus for marking the location of an object and that comprises an elongated and translucent or transparent tubular member having top and bottom ends, a mounting piece secured to the bottom end of the elongated and translucent or transparent tubular member, said mounting piece constructed and arranged for mounting from a mounting surface of the object so that the elongated and translucent or transparent tubular member is disposed in a substantially vertical position, said object being a snow plow blade attached to a plow vehicle that also has auxiliary lighting, said mounting surface of the snow plow blade being a horizontal flange of the snow plow blade having a hole therein, an elongated light string that extends within the elongated and translucent or transparent tubular member between the top and bottom ends of the elongated and translucent or transparent tubular member, wherein the elongated light string is comprised of an elongated and flat support strip and a plurality of LED's that are spaced along the elongated and flat support strip, a source of electrical energy for the elongated light string in the form of the auxiliary lighting, and conductor wiring for connecting the source of electrical energy to the elongated light string, wherein the mounting piece comprises a mounting coupling that includes a top collar for engagement with the bottom end of the elongated and translucent or transparent tubular member, a base that is integral with the top collar and that extends through the hole in the horizontal flange of the snow plow blade and a securing nut for holding the base to the horizontal flange of the snow plow blade, said base also including an upper portion that engages over the hole in the horizontal flange of the snow plow blade, said nut for threaded engagement with the base and for securing the horizontal flange of the snow plow blade between the nut and the upper portion of the base.

2. The apparatus of claim 1 wherein the bottom end of the elongated and translucent or transparent tubular member engages over the top collar.

3. The apparatus of claim 2 including separate connecting wires that couple between adjacent LED's, and wherein the top collar includes a plurality of spaced apart, annular and outwardly directed wings that engage with the bottom end of the elongated tubular member which is sufficiently pliable so as to firmly hold the tubular member with the top collar of the mounting coupling.

4. The apparatus of claim 1 wherein the elongated light string includes at least one LED that extends above the top end of the elongated and translucent or transparent tubular member so that the at least one LED is observable over the top end of the elongated and translucent or transparent tubular member.

5. The apparatus of claim 4 including more than one LED that extends completely above the top end of the elongated and translucent or transparent tubular member.

6. The apparatus of claim 3 including a crimp that is formed at the bottom end of the elongated tubular member at the plurality of spaced apart, annular and outwardly directed wings so as to firmly hold the bottom end of the tubular member with the top collar of the mounting coupling.

7. An apparatus for marking the location of an object and that comprises an elongated and translucent or transparent tubular member having top and bottom ends, a mounting piece secured to the bottom end of the elongated and translucent or transparent tubular member, said mounting piece constructed and arranged for mounting from a mounting surface of the object so that the elongated and translucent or transparent tubular member is disposed in a substantially vertical position, said mounting surface including a horizontal flange having a hole therein, an elongated light string that extends within the elongated and translucent or transparent tubular member between the top and bottom ends of the elongated and translucent or transparent tubular member, wherein the elongated light string is comprised of an elongated support strip and a plurality of LED's that are spaced along the elongated support strip, a source of electrical energy for the elongated light string, and conductor wiring for connecting the source of electrical energy to the elongated light string, wherein the mounting piece includes a mounting coupling having a top collar for engagement with the bottom end of the elongated and translucent or transparent tubular member and a base that is integral with the top collar and extends through the hole in the horizontal flange of the object.

8. The apparatus of claim 7 wherein the plate member forms part of a snow plow blade and including a nut for threading onto the base.

9. The apparatus of claim 7 wherein the elongated light string comprises a resilient elongated light strip that extends linearly within the elongated and translucent or transparent tubular member, and is arranged in a reverse arc at a top end thereof where the reverse arc extends above the elongated and translucent or transparent tubular member.

10. The apparatus of claim 9 wherein the base also including an upper portion that engages over the hole in the horizontal flange of the snow plow blade, said nut for threaded engagement with the base and for securing the horizontal flange between the nut and the upper portion of the base, wherein the bottom end of the elongated and translucent or transparent tubular member engages over the top collar, and wherein the top portion has an outer diameter that is greater than a diameter of the hole in the horizontal flange of the snow plow blade so that the top portion engages a top surface of the horizontal flange about the hole in the horizontal flange of the snow plow blade when the nut is secured.

11. An apparatus for marking the location of an object and that comprises an elongated and translucent or transparent tubular member having top and bottom ends, a mounting piece secured to the bottom end of the elongated and translucent or transparent tubular member, said mounting piece constructed and arranged for mounting from a mounting surface of the object so that the elongated and translucent or transparent tubular member is disposed in a substantially vertical position, said mounting surface including a horizontal flange having a hole therein, an elongated light string that extends within the elongated and translucent or transparent tubular member between the top and bottom ends of the elongated and translucent or transparent tubular member, wherein the elongated light string is comprised of an elongated and planar support strip and a plurality of LED's that are spaced along the elongated and planar support strip, a source of electrical energy for the elongated light string, and conductor wiring for connecting the source of electrical energy to the elongated light string, wherein the elongated light string includes at least one LED that extends completely above the top end of the elongated and translucent or transparent tubular member so that the one LED is observable over the top end of the elongated and translucent or transparent tubular member.

12. The apparatus of claim 11 including more than one LED that extends above the top end of the elongated and translucent or transparent tubular member, and wherein the support strip and spaced apart LED's extend substantially the entire length of the elongated and translucent or transparent tubular member that is disposed above the mounting piece.

13. The apparatus of claim 12 wherein the elongated light string comprises a resilient elongated light strip that extends linearly within the elongated and translucent or transparent tubular member, and is disposed in a reverse arc at a top end thereof where it extends above the elongated and translucent or transparent tubular member.

14. The apparatus of claim 11 wherein the object is a snow plow blade attached to a plow vehicle that also has auxiliary lighting, the snow plow blade including the horizontal flange having a hole therein for receiving a portion of the mounting piece and a locking nut for securing the mounting piece to the horizontal flange, the auxiliary lighting forming the source of electrical energy for the elongated light string.

15. The apparatus of claim 14 wherein said conductor wiring includes wiring that extends from the elongated light string, across a back side of the plow blade, along a plow blade support apparatus and to the auxiliary lighting.

16. The apparatus of claim 11 wherein the elongated light string comprises a resilient elongated light strip that extends linearly within the elongated and translucent or transparent tubular member, and is disposed in a reverse arc at a top end thereof where it extends above the elongated and translucent or transparent tubular member.

17. The apparatus of claim 16 wherein the reverse arc is formed by a top loop of the resilient elongated light strip, and wherein the plurality of LEDs comprise three LED's spacedly secured at the top loop of the resilient elongated light strip.

18. The apparatus of claim 17 wherein, of the three LED's, a first LED is disposed facing in a first direction; a second LED is disposed facing upwardly; and a third LED is disposed in a direction opposite to the first direction, and wherein all of the three LED's are disposed above a top edge of the elongated and translucent or transparent tubular member.

19. The apparatus of claim 11 wherein the object is a snow plow blade that includes at a top thereof the horizontal flange, wherein the mounting piece comprises a mounting coupling that includes a top collar for engagement with the bottom end of the elongated and translucent or transparent tubular member, a base that is integral with the top collar and that extends through the hole in the horizontal flange of the snow plow blade, a securing nut for holding the base to the horizontal flange of the snow plow blade, and a through passage in the mounting coupling, and wherein the conductor wiring extends from the elongated light string, through the through passage in the mounting coupling, under the horizontal flange and to the source of electrical energy.

20. The apparatus of claim 19 wherein the top portion has an outer diameter that is greater than a diameter of the hole in the horizontal flange of the snow plow blade so that the top portion engages a top surface of the horizontal flange about the hole in the horizontal flange of the snow plow blade when the nut is secured.

* * * * *